United States Patent
Di Pietro et al.

(10) Patent No.: US 9,930,057 B2
(45) Date of Patent: Mar. 27, 2018

(54) DYNAMIC DEEP PACKET INSPECTION FOR ANOMALY DETECTION

(71) Applicant: Cisco Technology, Inc., San Jose, CA (US)

(72) Inventors: Andrea Di Pietro, Lausanne (CH); Jean-Philippe Vasseur, Anchorage, AK (US); Javier Cruz Mota, Assens (CH)

(73) Assignee: Cisco Technology, Inc., San Jose, CA (US)

( * ) Notice: Subject to any disclaimer, the term of this patent is extended or adjusted under 35 U.S.C. 154(b) by 210 days.

(21) Appl. No.: 14/874,594

(22) Filed: Oct. 5, 2015

(65) Prior Publication Data

US 2017/0099310 A1  Apr. 6, 2017

(51) Int. Cl.
H04L 29/06 (2006.01)

(52) U.S. Cl.
CPC .................. H04L 63/1425 (2013.01)

(58) Field of Classification Search
CPC .................. H04L 63/14; H04L 63/1425
See application file for complete search history.

(56) References Cited

U.S. PATENT DOCUMENTS

| | | | |
|---|---|---|---|
| 8,813,221 B1 | 8/2014 | Dubrovsky et al. | |
| 2013/0195457 A1 | 8/2013 | Levy et al. | |
| 2015/0193696 A1 | 7/2015 | Vasseur et al. | |
| 2016/0359695 A1* | 12/2016 | Yadav | G06N 99/005 |

OTHER PUBLICATIONS

"Fast Flux", Internet Page, https://en.wikipedia.org/wiki/Fast Flux, 3 pages, printed Aug. 27, 2015, Wikimedia Foundation, Inc.
"Netflow Collection with FlowCollector", Internet page https://www.lancope.com/products/stealthwatch-flowcollector, printed Aug. 27, 2015, 7 pages, Lancope, Inc., Alpharetta, GA.
Sajassi, et al., "BGP MPLS Based Ethernet VPN", Network Working Group Internet Draft, draft-ietf-l2vpn-evpn-11, Oct. 18, 2014, 52 pages, Internet Engineering Task Force Trust.

* cited by examiner

*Primary Examiner* — Izunna Okeke
(74) *Attorney, Agent, or Firm* — Parker Ibrahim & Berg LLC; James M. Behmke; Stephen D. LeBarron

(57) ABSTRACT

In one embodiment, a device in a network captures a first set of packets based on first packet capture criterion. The captured first set of packets is provided for deep packet inspection and anomaly detection. The device receives a second packet capture criterion that differs from the first packet capture criterion. The device captures a second set of packets based on the second packet capture criterion. The device provides the captured second set of packets for deep packet inspection and anomaly detection. The anomaly detection of the captured first and second sets of packets is performed by a machine learning-based anomaly detector configured to generate anomaly detection results based in part on one or more traffic metrics gathered from the network and based further in part on deep packet inspection results of packets captured in the network.

17 Claims, 10 Drawing Sheets

DYNAMIC DEEP PACKET INSPECTION FOR ANOMALY DETECTION

TECHNICAL FIELD

The present disclosure relates generally to computer networks, and, more particularly, to dynamically performing deep packet inspection to detect anomalies in a network.

BACKGROUND

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests, to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Another form of network attack is a fast flux service network (FFSN) which is used by advanced malware to connect to command and control (C2) centers through multiple layers of rotating proxies. Notably this type of attack generally operates by having multiple nodes in a network register and deregister their addresses to a single domain name via a domain name system (DNS). With such an attack, upwards of thousands of entries may be created for a single name.

Botnets represent one way in which DDoS and FFSN attacks may be launched against a network. In a botnet, a subset of the network devices may be infected with malicious software, thereby allowing the devices in the botnet to be controlled by a single master. Using this control, the master can then coordinate the attack against a given network resource.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
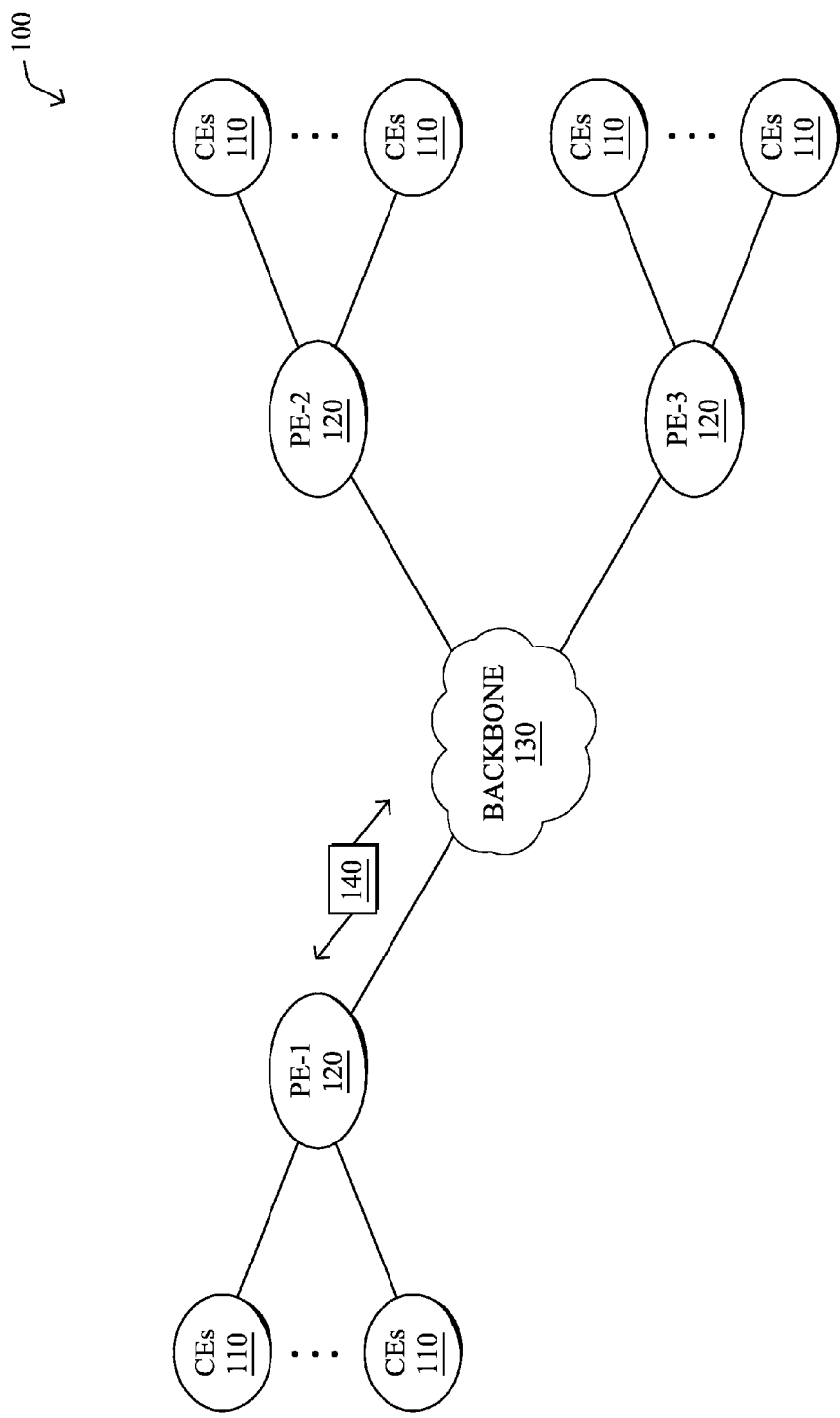
FIGS. 1A-1B illustrate an example communication network.

According to one or more embodiments of the disclosure, a device in a network captures a first set of packets based on first packet capture criterion. The captured first set of packets is provided for deep packet inspection and anomaly detection. The device receives a second packet capture criterion that differs from the first packet capture criterion. The device captures a second set of packets based on the second packet capture criterion. The device provides the captured second set of packets for deep packet inspection and anomaly detection. The anomaly detection of the captured first and second sets of packets is performed by a machine learning-based anomaly detector configured to generate anomaly detection results based in part on one or more traffic metrics gathered from the network and based further in part on deep packet inspection results of packets captured in the network.

In further embodiments, a device in a network receives an anomaly detection result from a machine learning-based anomaly detector. The anomaly detection result is based in part on one or more traffic metrics and based in part on deep packet inspection results for a first set of packets. The first set of packets is captured based on a first packet capture criterion. The device determines a second packet capture criterion. The device causes, using the second packet capture criterion, a second set of packets to be captured for deep packet inspection and results of the deep packet inspection of the second set of packets to be used as input to the machine learning-based anomaly detector.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, potentially with a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
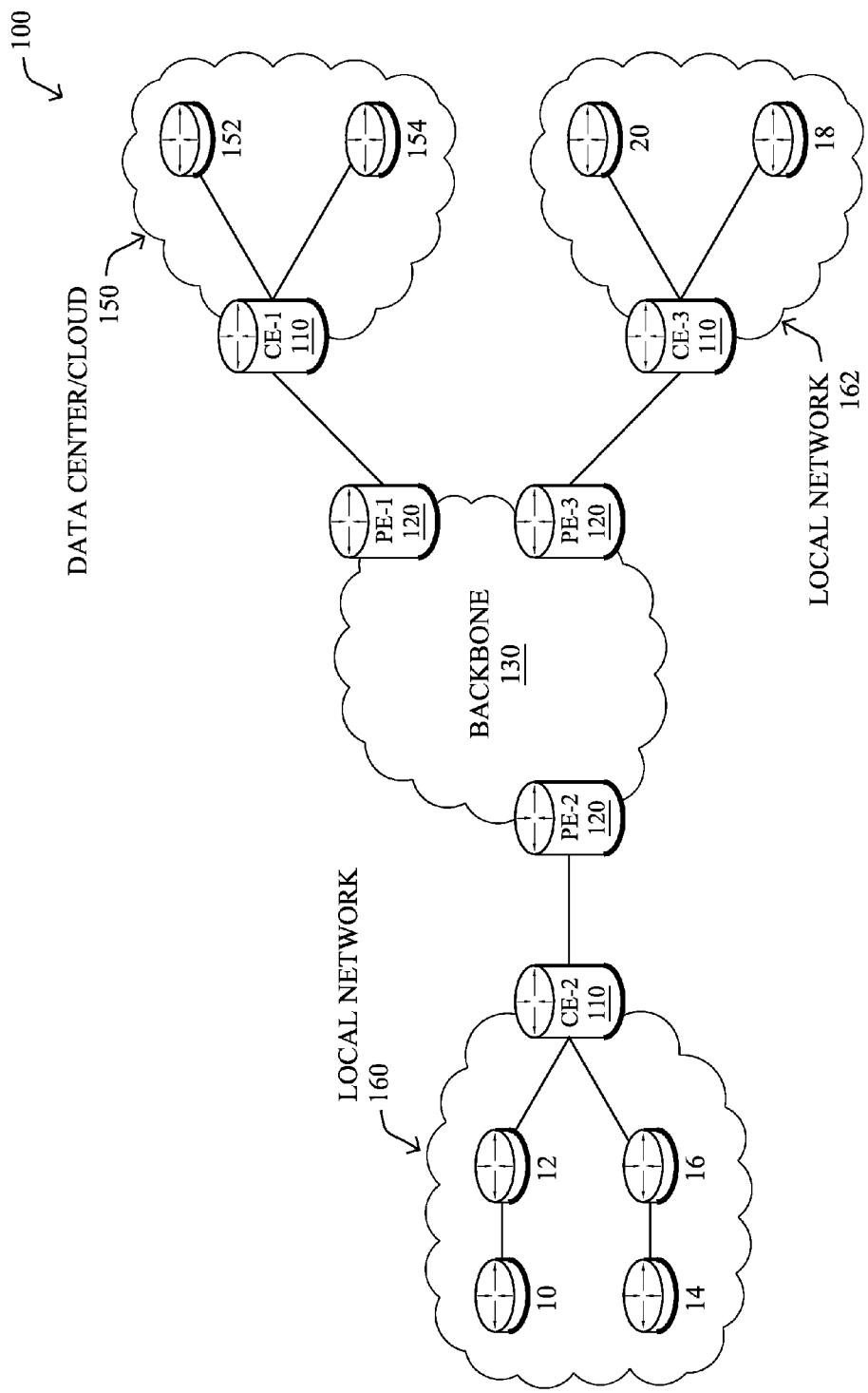

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, devices, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical devices), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
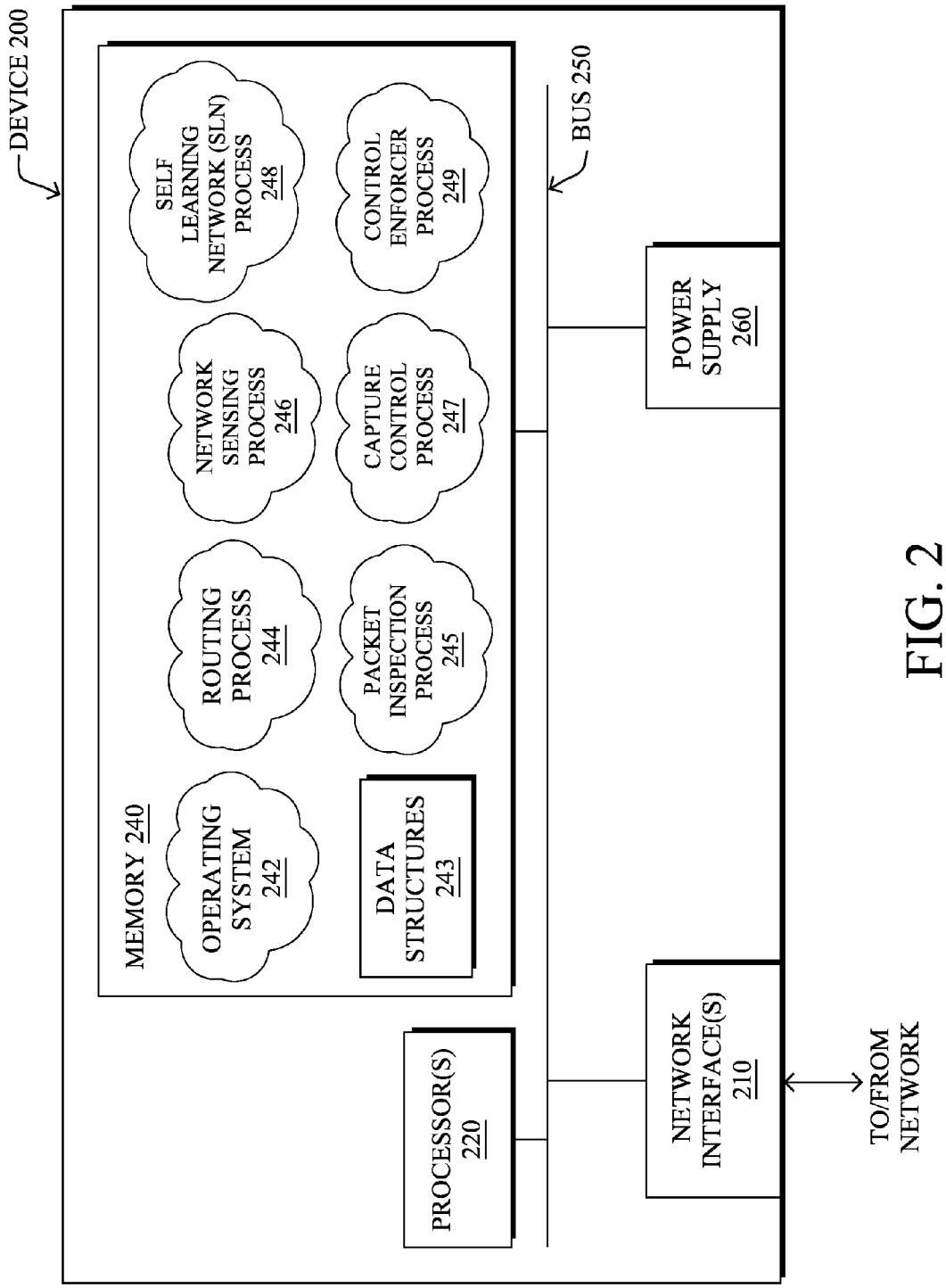
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 243. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a deep packet inspection (DPI) process 245, a network sensing process 246, a capture control process 247, a self learning network (SLN) process 248, and/or a capture control enforcer process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN" <draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be configured to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Such anomalies may be detected using advanced machine learning algorithms(s) capable of modeling subtle changes or correlation between changes (e.g., unexpected behavior) in a highly dimensional space. Such anomalies are raised in order to detect the presence of a 0-day malware; such a malware may be used in order to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Malware may be detected because of their impact on traffic, host models, graph-based analysis, etc., when attempting to connect to C2 channel, move laterally, or ex-filtrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, a SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured ACL, route redistribution policy, routing policy, QoS policy maps, or the like, may have dramatic consequences such a traffic blackhole, QoS degradation, etc. Such misconfiguration may be advantageously identified by SLN process 248, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering algorithms are k-means, density based spatial clustering of applications with noise (DB-SCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

Figure 3:
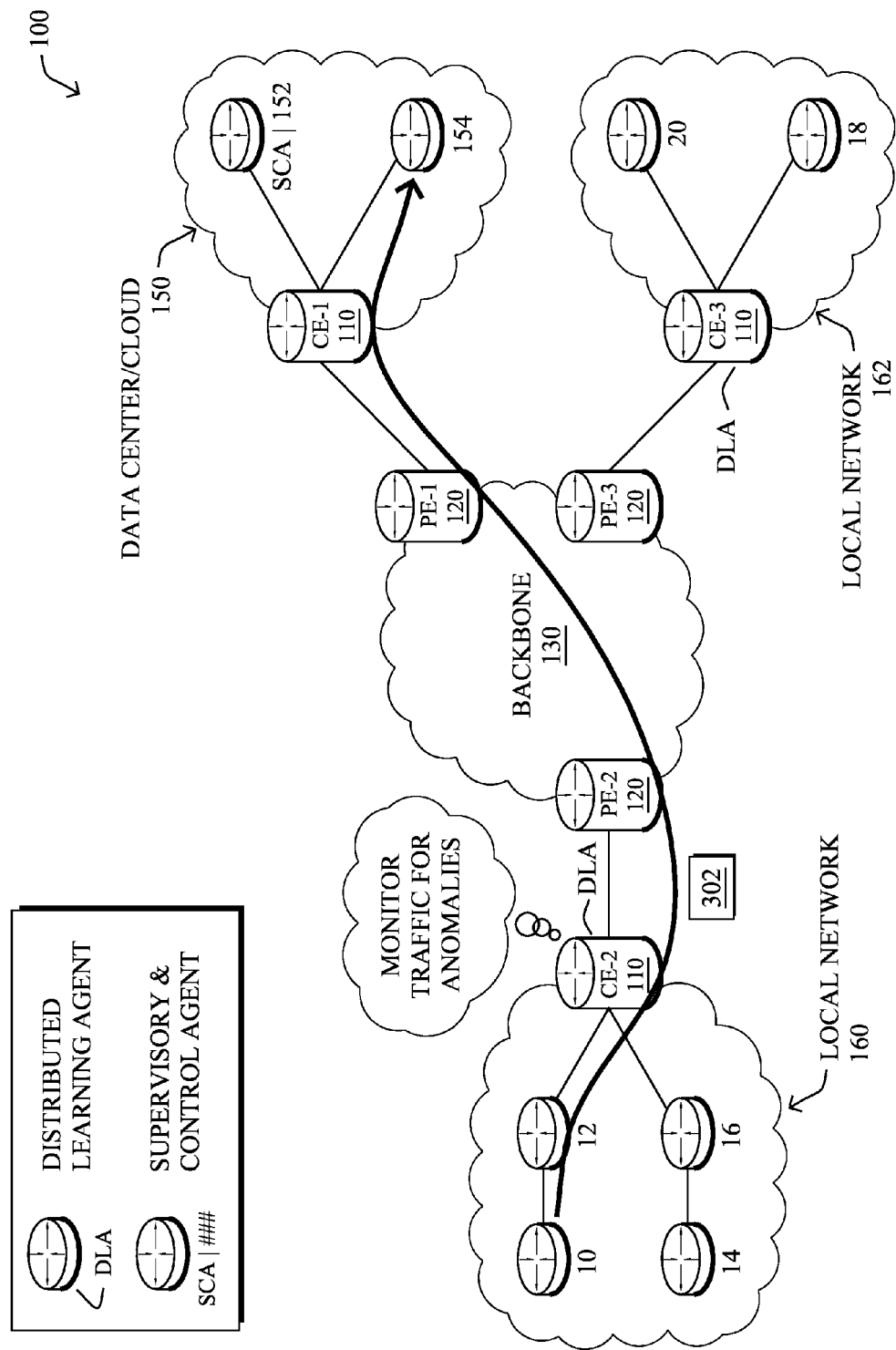
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248). Such an infrastructure may include certain network devices acting as distributed learning agents (DLAs) and one or more supervisory/centralized devices acting as a supervisory and control agent (SCA). A DLA may be configured to monitor network conditions (e.g., router states, traffic flows, etc.), perform anomaly detection on the monitored data using one or more machine learning models, report detected anomalies to the SCA, and/or perform local mitigation actions. Similarly, an SCA may be configured to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

Anomalies such as DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SCA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SCA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, Internet Behavioral Analytics (IBA) may be used as part of the anomaly detection mechanisms in network 100. In general, IBA refers to the use of advanced analytics coupled with networking technologies, to detect anomalies in the network. Although described later with greater details, the ability to model the behavior of a device (networking switch/router, host, etc.) will allow for detection of the presence of a malware, which is complementary to the use of Firewall making use of static signatures. Observing behavioral changes (deviation from modeled behavior) thanks to (aggregated) flows records, deep packet inspection, etc., may allow detection of an anomaly such as an horizontal movement (e.g. propagation of a malware, etc.), or an attempt to perform information exfiltration.

As noted above, traffic flow information may be used to detect anomalies in the network, such as malicious attacks, misconfigured devices, etc. Example mechanisms to extract traffic flow information include, but are not limited to, the IP Flow Information Export (IPFIX) protocol, Netflow™ by Cisco Systems, Inc., and the like. Application information regarding the traffic may be captured using the Network Based Application Recognition (NBAR) mechanism by Cisco Systems, Inc., or a similar mechanism operable to determine the application type associated with a particular flow of traffic. These mechanisms often provide a large amount of information about the traffic in the network, which can be used to detect anomalies. In addition, these mechanisms can also reduce the amount of data that has to undergo traffic analysis. In particular, the volume of traffic flow records often amounts to approximately 1% of that of the original traffic, although other percentages are also possible depending on the composition of the traffic. Further, while these records are primarily focused on Layer 4 information (e.g., flows are commonly identified via five-tuples that include the source and destination addresses, the source and destination ports, etc.), certain mechanisms can also characterize the application layer of the traffic.

While traffic flow information may be useful to detect certain types of anomalies, other anomalies may be more difficult to detect using just traffic flow records. Notably, some malware-based attacks are purposely designed to be stealthy and appear normal from the standpoint of traffic/application flow records. For example, fast flux service network (FFSN) attacks use advanced malwares to connect to command and control centers through multiple layers of rotating proxies and can only be detected based on the particular features of the queried DNS domains. In greater detail, the queries of the infected hosts tend to have short time to live (TTL) values, since they vary often to avoid detection and may form fast changing relays in different autonomous systems.

Deep packet inspection presents one technique that may be used to detect certain types of network anomalies and attacks, such as FFSN attacks. Notably, deep packet inspection may be used to retrieve the contents of the packets in the network, which is typically not captured by administrative tools that capture metrics regarding traffic/application flows. In another example, some malware may use a variety of different protocols for purposes of data exfiltration (e.g., by using various protocol headers). In such cases, the different headers may conceal the common, malicious purpose of the packets to traffic/application analysis mechanisms. However, deep packet inspection of the payloads of these packets may shine light on the attack. As would be appreciated, these are examples of one among many control plane protocols that can provide useful information for anomaly detection. This especially holds true in LLNs/IoT networks whereby traffic analysis mechanisms are typically not available on low-end platforms (e.g., connected grid routers, etc.) and where deep packet inspection on network traffic and control plane protocols can be of interest.

While deep packet inspect may enhance an anomaly detection mechanism, having a machine learning anomaly detector analyze each and every packet on a link is often not practical, as it may create an excessive burden on the traffic analysis engine. Conversely, statically selecting only a handful of control protocols to be captured for deep packet inspection is not a flexible enough approach for providing the required data for anomaly detection. In particular:

- The subset of protocols to be captured for deeper analysis may not be known a-priori (e.g., it may depend on the type of suspected anomaly). Moreover, non-default ports could be used.
- Some protocols, most notably HTTP, make up a non-negligible percentage of the overall traffic volume. As a consequence, selecting all of their associated traffic for deep packet inspection would create a potential scalability issue.
- Deep packet inspection may be useful in a second step, should the user require further investigation of the anomalous behavior of a protocol.

Dynamic Deep Packet Inspection for Anomaly Detection

The techniques herein provide for a machine learning-based mechanism for dynamically selecting which portions of the network traffic should be captured and/or analyzed using deep packet inspection. In various cases, this selection may be based on the output of one or more machine learning processes or specified by a user via a user interface. In another aspect, the results from the deep packet inspection may be analyzed by the machine learning-based anomaly detector using "multi input" models which can detect an anomaly with high precision.

Specifically, according to one or more embodiments of the disclosure as described in detail below, a device in a network captures a first set of packets based on first packet capture criterion. The captured first set of packets is provided for deep packet inspection and anomaly detection. The device receives a second packet capture criterion that differs from the first packet capture criterion. The device captures a second set of packets based on the second packet capture criterion. The device provides the captured second set of packets for deep packet inspection and anomaly detection. The anomaly detection of the captured first and second sets of packets is performed by a machine learning-based anomaly detector configured to generate anomaly detection results based in part on one or more traffic metrics gathered from the network and based further in part on deep packet inspection results of packets captured in the network.

Illustratively, the techniques described herein may be performed by hardware, software, and/or firmware, such as in accordance with the processes 245-249, which may contain computer executable instructions executed by the processor 220 (or by an independent processor of interfaces 210) to perform functions relating to the techniques described herein. For example, the techniques herein may be treated as extensions to conventional protocols, such as the various PLC protocols or wireless communication protocols, and as such, may be processed by similar components understood in the art that execute those protocols, accordingly.

Operationally, the techniques herein may be used to implement a dynamic feedback-based mechanism in a network for selecting a portion of network traffic to be inspected through deep packet inspection, to provide more detailed information to an anomaly detector that uses one or more machine-learning processes. Note that by "portion" of traffic, as used herein, this may refer to the traffic type (e.g., of a known application, identified based on a specific set of protocols IDs, etc.) and/or to a deep packet inspection profile (e.g., a specified percentage of traffic to be inspected, a time duration for the inspection, etc.).

Figure 4:
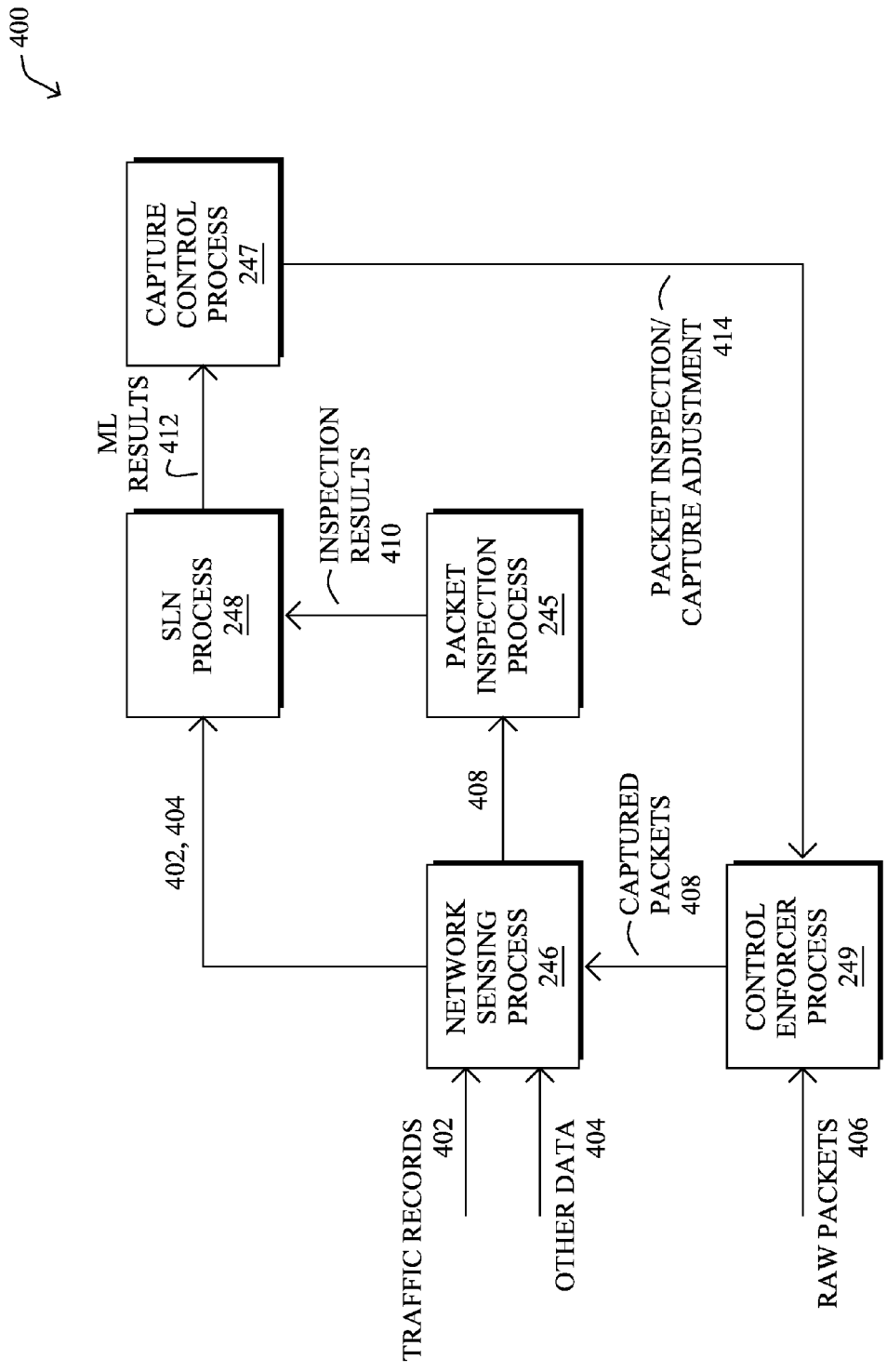
FIG. 4 illustrates an example architecture for adjusting the capture of packets for deep packet inspection (DPI) and anomaly detection.

Referring now to FIG. 4, an example architecture 400 is shown for adjusting the capture of packets for deep packet inspection (DPI) and anomaly detection, according to various embodiments. As shown, a number of software-based components/processes may be used to implement architecture 400 on a single device or across multiple devices in a network.

A core component of architecture 400 is a capture control component (CCC) (e.g., capture control process 247), which is operable to select the portion of traffic which will be captured for deep packet inspection. Another component of architecture 400 is a capture control enforcement component (CCE) (e.g., control enforcer process 249). In various implementations, the CCE may be co-located on the same device as the CCE, or located on different devices in the network that are in communication with one another.

In one embodiment, the CCC receives the results of the computation of the anomaly detector (e.g., SLN process 248), which itself may comprise any number of machine learning-based processes that may be supervised and/or unsupervised. In greater detail, the anomaly detector component may include machine learning models that take as input traffic flow information/reports (e.g., features computed based on Nedlow or similar traffic reports) and models that take as input a larger set of features (e.g., based on both traffic reports and on deep packet inspection results).

The one or more machine learning models of the anomaly detector may be of various forms. For example, anomaly detectors that use unsupervised machine learning need to be continuously fed with features based on the current traffic. This allows their models to be updated accordingly, to model normal traffic. However, supervised machine learning does not have such a constraint. In addition, the models of the anomaly detector can have different granularities. For example, in some cases, the detector may maintain a different model for each of the hosts located behind the router (e.g., host based models) while, in other cases, the anomaly detector may maintain a separate model for the entire traffic stream (e.g., traffic based models).

During operation, the machine learning models of the anomaly detector (e.g., SLN process 248) may continuously monitor a stream of information regarding the network, to detect anomalies and known attack patterns. In some embodiments, this stream of input information may be provided by a network sensing component (NSC) (e.g., network sensing process 246, as shown). This component may be co-located on the same device as the anomaly detector or located on a different device that provides the information to the device hosting the anomaly detector.

Generally, the NSC may receive information regarding the network from various sources: 1.) traffic flow data/records (e.g., Netflow records, IPFIX information, etc.), 2.) raw packets, and/or 3.) other information from other sources regarding the state of the network (e.g., device information such as queue states, processor or memory usage, etc.). For example, as shown, network sensing process 246 may receive traffic record information 402, other data 404, and/or captured packets 408 (e.g., raw packets captured from the traffic flows). In various embodiments, the CCE (e.g., control enforcer process 249) may itself capture packets 408 from the flow of raw packets 406 or, alternatively, provide control over the NSC which captures the raw packets itself.

The NSC may filter and preprocess the received information for export to the various other components of architecture 400. For example, network sensing process 246 may export the preprocessed traffic records 402, other data 404, etc., to SLN process 248 for anomaly detection. In some embodiments, network sensing process 246 may export the captured raw packets 408 to an external intrusion protection system (IPS) device (not shown). Such an IPS device may, for example, be configured to use a signature-based strategy to detect network intrusions, which may be performed in lieu of, or in conjunction with, the machine learning-based anomaly detection described herein. Moreover, this allows devices to share the same IPS device across a number of vantage points on the edge of the network, in some cases.

Packet inspection process 245 may receive the captured packets 408 from the NSC and perform deep packet inspection on the received packets. Generally, deep packet inspection analyzes the packet information that is normally not considered for purposes of routing. For example, deep packet inspection may also extract and analyze the Layer 2 headers, payload, etc., of the packets, to produce the inspection results. As shown, packet inspection process 245 may perform deep packet inspection on captured packets 408 and provide the inspection results 410 for use as input to one or more of the machine-learning analyzers of the anomaly detector.

In various embodiments, the CCC may change the packet capture criteria for deep packet inspection by providing control instructions to the CCE, which is responsible for reconfiguring the packet capture on the fly. For example, as shown, capture control process 247 may provide a packet inspection/capture adjustment 414 to control enforcer process 249, which causes control enforcer process 249 to adjust which packets are captured for further inspection by packet inspection process 245. Example techniques to implement the control over the CCE may include, but are not limited to, application programming interface (API) commands (e.g., via One Platform Kit (OnePK) APIs from Cisco Systems, Inc., etc.), via command line interface (CLI) instructions, using a Netconf/Yang model, or the like.

As would be appreciated, various components of architecture 400 may be implemented in a central manner (e.g. on a single device/router) or in a distributed manner (e.g., across multiple devices in the network). Further, the functions described herein with respect to a particular one of processes 245-249 may be integrated into any of the other processes, in various implementations.

Thus, architecture 400 implements a control mechanism that uses feedback to dynamically adjust which packets are captured and analyzed using deep packet inspection, for input to an anomaly detector. For example, if anomaly detection results 412 generated by the anomaly detector indicate to capture control process 247 that no anomalies or attacks were detected, the CC may continuously change the fraction of the traffic captured for deep packet inspection by packet inspection process 245 and anomaly detection by SLN process 248.

Figure 5A:
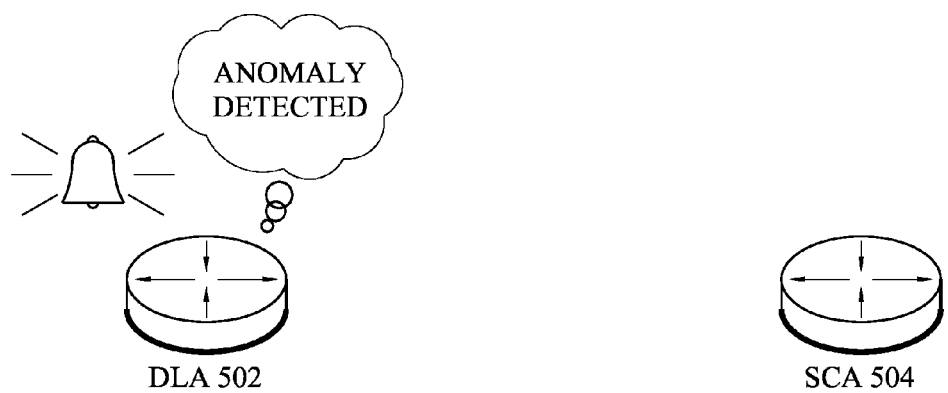
FIGS. 5A-5E illustrate examples of the capture of packets being adjusted.
Figure 5B:
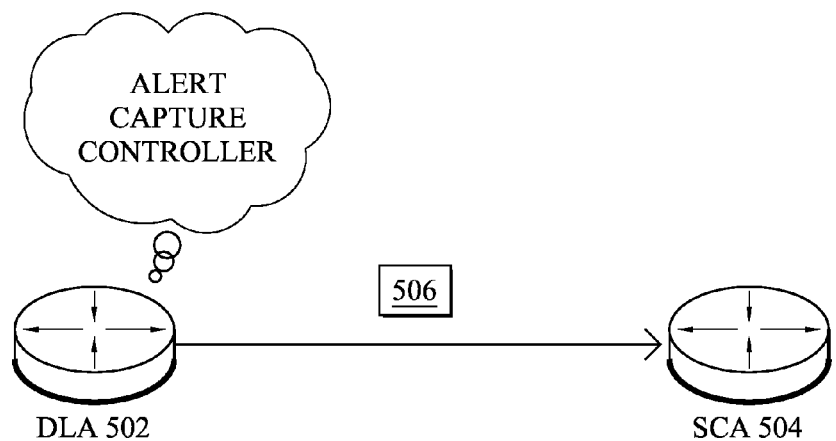

Referring now to FIGS. 5A-5E, examples are shown of the capture of packets being adjusted in a network, according to various embodiments. As shown in FIG. 5A, assume that DLA 502 detects a network anomaly by analyzing traffic information, deep packet inspection results from captured packets, and/or other information. In such a case, as shown in FIG. 5B, DLA 502 may send the anomaly detection results 506 to SCA 504, to indicate the detection of an anomaly. For purposes of illustration, assume that SCA 504 executes a CCC that provides control over the CCE of DLA 502. In various embodiments, SCA 504 may adjust which packets are captured for deep packet inspection and anomaly detection by DLA 502 based on anomaly detection results 506 (e.g., to focus on traffic from nodes having certain addresses, etc.). SCA 504 may also adjust which packets are captured even if anomaly detection results 506 indicate that no anomaly was detected or if no results are provided at all by DLA 502 (e.g., SCA 504 may assume that all anomaly detection results are normal unless informed otherwise).

Figure 5C:
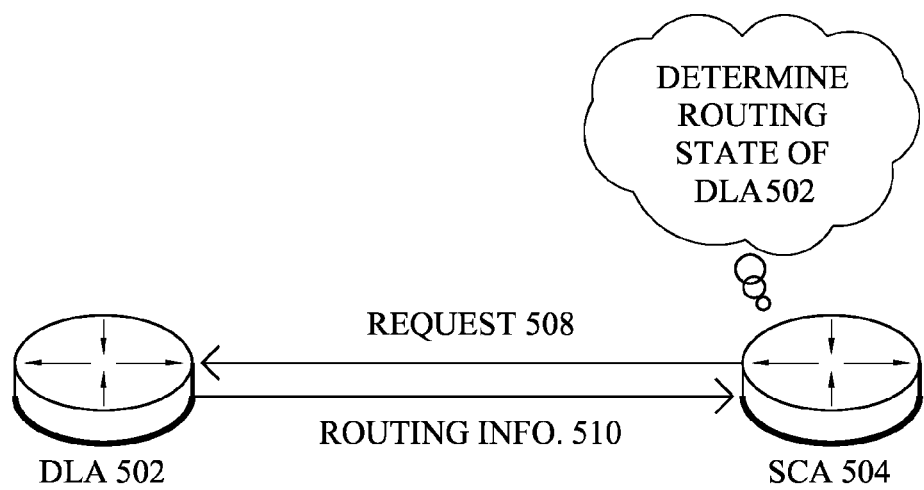

In some embodiments, the CCC of SCA 504 may select packets from specific subsets of hosts for further inspection based on the network context. For example, as shown in FIG. 5C, SCA 504 may send a request 508 to DLA 502 for the routing state of the network element. In response, DLA 502 may return the requested routing information 510 to SCA 504 such as, e.g., information regarding the routing information base (RIB) of DLA 502, BGP table information, or the like. In other embodiments, DLA 502 may provide this information to SCA 504 on a push basis. Example technologies to enable this access of information may include, but are not limited to, OnePK or similar APIs, Netconf/Yang models, or the like.

In a non-limiting example, if the CCC of SCA 504 has a list of the hosts which are located in the internal network behind the router/DLA 502 (e.g., via routing information 510), SCA 504 may instruct the CCE of DLA 502 to capture traffic directed to, or coming from, a subset of IP addresses. The CCC may cause the subset to be continuously rotated, to provide the machine learning models of DLA 502 to observe detailed features related to all of the hosts behind the router of DLA 502. This allows DLA 502 to keep its detailed, host-based models up to date without the burden of capturing all of the monitored traffic at the same time. By segregating the list of hosts of interest for which deep packet inspection is required, this also allows the system to build models with different granularity and level of precision. Having the ability to trigger deep packet inspection according to blocks of source IP addresses may also allow different modeling approaches to be adopted. For example, the CCC may be informed of suspicious autonomous systems or even internal subnets (e.g., WiFi guest) and, in turn, activate deep packet inspection with different sets of criteria (e.g., inspect all packets for protocol HTTP sources at subnet N1, or inspect all packets for all protocols for packets destined to autonomous system Y).

In further cases, the CCC may instruct the CCE to capture a particular combination of control plane protocols and subsequently rotate different combinations. For example, the CCC may instruct the CCE to capture Domain Name System (DNS) and Network Time Protocol (NTP) packets for a certain period, then DNS and Session Initiation Protocol (SIP) packets, then SIP and NTP packets, etc. This allows the anomaly detector to update different detailed traffic based models.

In another mode of operation, the CCC may determine the one or more packet capture criteria based on input from a user via a user interface. For example, the user may operate the interface to send an explicit message to the CCC that specifies the type of traffic to be captured (e.g., protocol, level of sampling, etc.) and/or other control parameters (e.g., capture duration, etc.). In turn, the CCC may notify the CCE of the specified criteria, to cause the CCE to begin capturing the matching packets.

Figure 5D:
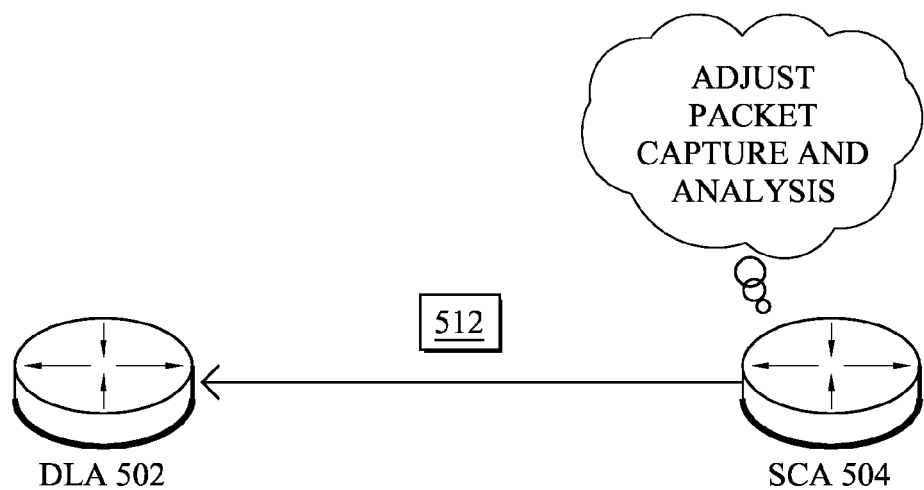

As shown in FIG. 5D, the CCC on SCA 504 may send a traffic capture instruction/message 512 to the corresponding CCE on DLA 502, to cause DLA 502 to begin capturing packets according to the criteria in message 512. In some embodiments, message 512 may be a custom unicast or multicast IPv4 or IPv6 message called Traff_Cap( ) that specifies any or all of the following packet capture criteria/type-length-values(TLVs):

A specified portion of the traffic. This TLV specifies the subset of the traffic to be captured for deep packet inspection. This can be expressed as any or all of the following:
IP prefixes and ranges.
Ports or port ranges for Layer-4 protocols.
Access Control Lists (ACLs), in case a set of specific hosts has to be specified.
Layer-7 application ID(s). In this case, a particular deep packet inspection-based classification technology (e.g., NBAR from Cisco Systems, Inc., or the like) may be used. As a consequence, the specific ID for a particular application will depend on the specific technology used.
A list of one or more interface where deep packet inspection is to be performed. Optionally a direction flag can also be used to specify inbound/outbound traffic.
Validity parameters. This can be specified as or all of the following:
A particular time period expressed as start/end timestamps.
A flag specifying that the rule is valid until a subsequent Traff_Cap( ) message is received.

For example, message 512 can instruct the CCE of DLA 502 to capture all of the HTTP traffic (e.g., specified as the traffic which is assigned ID 80 by NBAR) coming from a specific set of hosts (e.g., specified as an ACL) and directed to addresses in a specific autonomous system. These criteria can then be installed and enforced on specific interfaces of DLA 502 for a specified period of time.

As noted previously, the CCC of SCA 504 may issue message 512 to DLA 502 based on the results of the anomaly detector of DLA 502 and/or on user feedback. For example, if an anomaly alarm is raised by DLA 502, SCA 504 may instruct DLA 502 to capture packets related to the alarm. In other words, the contextual information in the alarm may be used to select the packet capture criteria included in message 512.

In both user-driven and detector-driven modes of operation, the request may either be explicit or generic. Indeed, the user may not know a priori which application layer data is of interest that should be provided to the anomaly detector to detect new anomalies. Thus, such a request may be generic, requesting to have a search-based approach whereby the CCC should investigate and make use of different strategies. For example, one such strategy may be to apply deep packet inspection on a set S1 of traffic (e.g., protocol P1, P2, . . . ) for T-number of seconds. Note that the strategy may be governed by the output of the anomaly detector (e.g., a high number of VoIP anomalies may lead to performing deep packet inspection on RTCP, SIP, . . . ).

In further cases, the packet capture criteria may be based in part on the resources available to the machine learning-based anomaly detector and/or the network elements. For example, the CCC may keep adding new candidates for packet capture and inspection according to the local resources of networking device(s) involved. Notably, deep packet inspection is a costly operation for the devices carrying out the inspection, as well as carrying out the machine learning-based anomaly detection. Should the amount of data become an issue, the CCC may instruct the CCE to stop the capture/inspection of packets altogether or otherwise adjust the frequency or number of protocols captured for deep packet inspection. Conversely, if the CCC determines that excess resources are available, the CCC may increase the frequency of the capture of the packets or adjust which packets are captured for inspection.

Figure 5E:
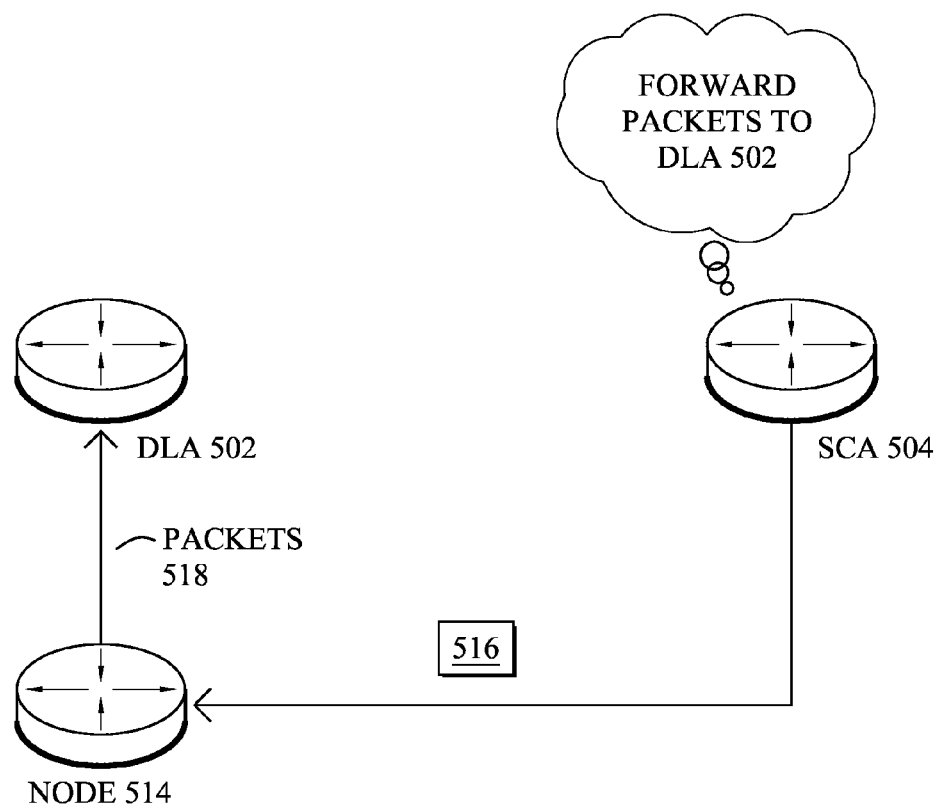

In some embodiments, as shown in FIG. 5E, the CCC of SCA 504 may instruct another device to capture packets for anomaly detection analysis by DLA 502. In particular, the router/device of DLA 502 may not have visibility on traffic not flowing through it. In such situations, the CCC of SCA 504 may send an instruction/message 516 to another node in the network (e.g., node 514) hosting a CCE, to cause the node to capture the specified packets and provide the captured packets 518 or deep packet inspection results derived therefrom, to DLA 502 for anomaly detection analysis.

As noted previously, the CCE may be configured to capture the selected subset of traffic and provide the captured packets to the NSC. In turn, the corresponding features (e.g., the results of performing deep packet inspection on the captured packets) may be provided as input to the machine learning-based anomaly detector. Notably, classifiers of the detector may be trained using deep packet inspection results from before the anomaly, thank to the dynamic packet capture techniques disclosed herein. Thus, the classifiers may be operable to detect anomalies in the newly captured data, as well. If an anomaly is still detected, the anomaly detector may raise an alert (e.g., to notify the CCC, a user, etc.). In another embodiment, if the CCC does not receive any alarm by the detector for a configurable amount of time, it may remove the current packet capture instruction from the CCE.

Figure 6:
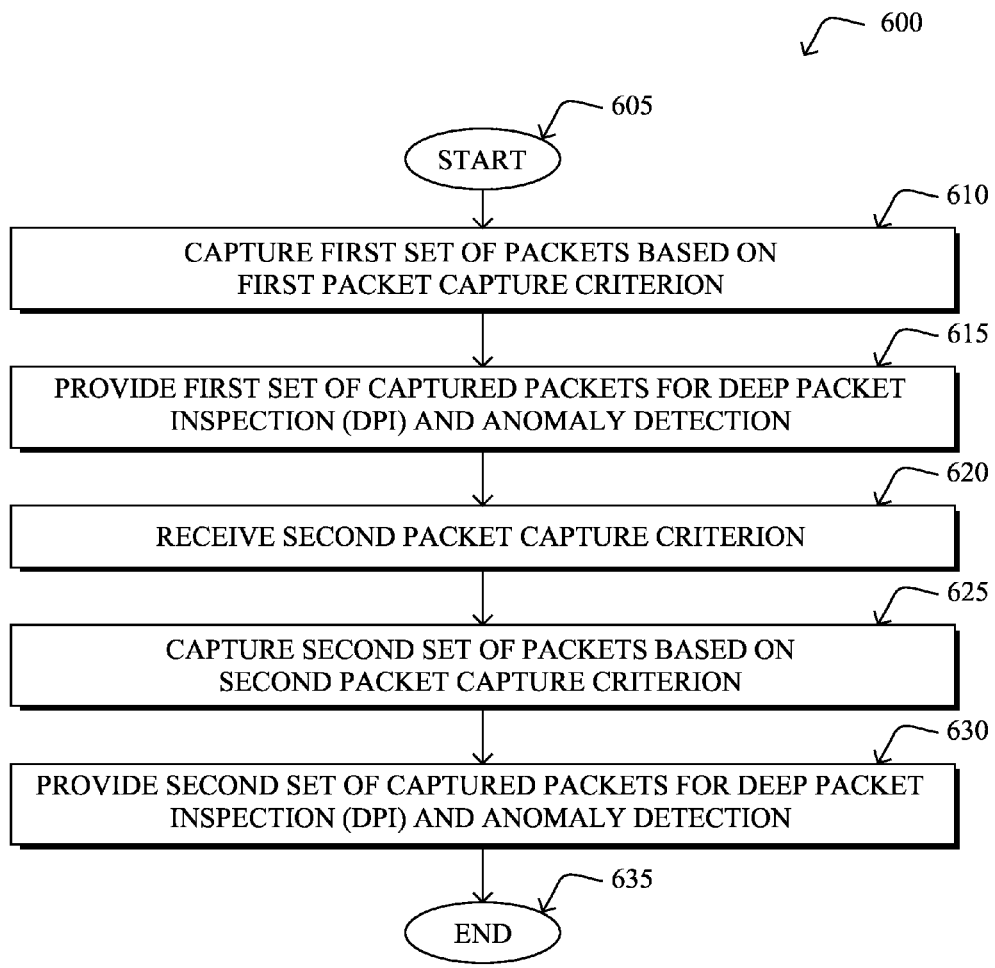
FIG. 6 illustrates an example simplified procedure for capturing packets for DPI and anomaly detection.

FIG. 6 illustrates an example simplified procedure for capturing packets for deep packet inspection and anomaly detection, in accordance with one or more embodiments described herein. The procedure 600 may start at step 605, and continues on to step 610 where, as described in greater detail above, a device in a network may capture a first set of packets based on a first packet capture criterion (or set of criteria). In various embodiments, the packet capture criterion may specify one or more network address prefixes, one or more network address ranges, one or more ports, access control list information, one or more interfaces, or one or more applications associated with traffic in the network, timing information (e.g., when the packets should be captured), or any other parameters that may be used to control which packets are captured by the device and when.

At step 615, as described in greater detail above, the device may provide the captured first set of packets for deep packet inspection and anomaly detection. In various embodiments, the anomaly detection may be performed by a machine-learning based anomaly detector configured to generate anomaly detection results based in part on one or more traffic metrics gathered from the network and based further in part on deep packet inspection results of the captured first set of packets.

At step 620, the device may receive a second packet capture criterion, as detailed above. For example, the device may receive an instruction from a supervisory device or process (e.g., the CCC described above) that instructs the device to begin capturing packets according to one or more different criteria than that used to capture the first set of packets in step 610.

At step 625, as detailed above, the device may capture a second set of packets based on the received second packet capture criterion. For example, the first packet capture criterion may specify a first range of network addresses from which packets should be captured and the second packet capture criterion may specify a different range of network addresses for the capture. In turn, the device may adjust which packets are captured, and potentially when, to capture the second set of packets.

At step 630, the device may provide the captured second set of packets for deep packet inspection and anomaly detection, as described in greater detail above. Notably, the second set of packets may be processed in a similar manner as that of the first set of captured packets (e.g., by performing deep packet inspection and using the results as input to a machine learning-based anomaly detector). Thus, the device may dynamically change which packets are captured for purposes of deep packet inspection and anomaly detection, based on the receipt of a new packet capture criterion from a supervisor. The procedure 600 then ends at step 635.

Figure 7:
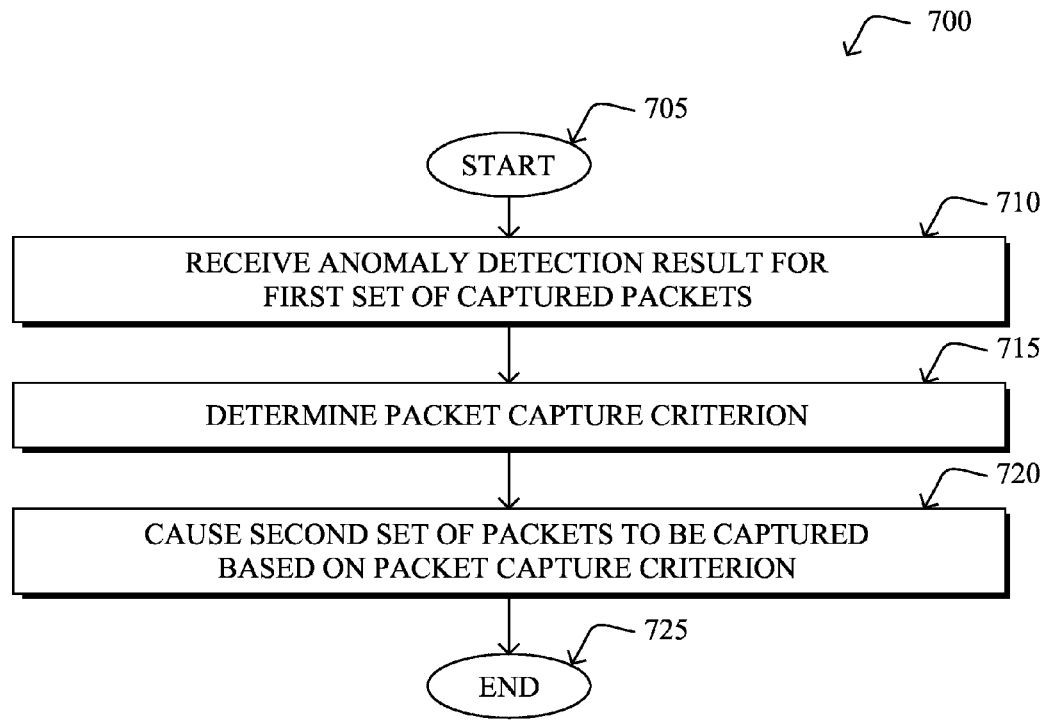
FIG. 7 illustrates an example simplified procedure for controlling the capture of packets in a network.

FIG. 7 illustrates an example simplified procedure for controlling the capture of packets in a network, in accordance with one or more embodiments described herein. The procedure 700 may begin at step 705 and continue on to step 710 where, as described in greater detail above, a device in a network may receive an anomaly detection result for a first set of captured packets. In particular, deep packet inspection results for the set of packets may be analyzed by a machine learning-based anomaly detector, to produce the anomaly detection result. Such a result may also be based in part on an analysis of traffic information by the anomaly detector.

At step 715, as detailed above, the device may determine a packet capture criterion. In some embodiments, the packet capture criterion may be determined in part on the received anomaly detection result. For example, if the result indicates that an anomaly was detected, the criterion may be selected to cause the capture of certain packets that may be related to the anomaly. In another example, if the results indicate that the network is functioning normally, the packet capture criterion may be selected to cause rotating groups of packets to be captured and analyzed. In another embodiment, the packet capture criterion may be determined based on input received from a user interface (e.g., a user may specify which packets should be captured for deeper analysis).

At step 720, the device may cause a second set of packets to be captured based on the determined packet capture criterion, as described in greater detail above. In some embodiments, if the device itself is configured to capture packets, the device may begin capturing new packets according to the packet capture criterion. In other embodiments, the device may provide an instruction that includes the criterion to another device that performs the packet capture. Procedure 700 then ends at step 725.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, allow for the dynamic adjustment of which packets are captured for deep packet inspection and anomaly detection. Notably, deep packet inspection can disclose high value information for detecting subtle anomalies. However, performing deep packet inspection on all of the observed traffic is not a scalable approach. This is especially true on low end platforms used in LLNs and IoT networks. By dynamically controlling which subset of packets are inspected, only packets that are likely to contain information about a network anomaly may be captured. This may improve the precision and sensitivity of the machine learning-based anomaly detector that relies on the result s of the deep packet inspection. In further aspects, the techniques herein can be integrated with an external IPS appliance, in order to combine the advantages of signature-based detection with machine learning-based detection.

While there have been shown and described illustrative embodiments that provide for dynamic adjusting which packets are captured for deep packet inspection and anomaly detection, it is to be understood that various other adaptations and modifications may be made within the spirit and scope of the embodiments herein. For example, the embodiments have been shown and described herein with relation to certain network configurations. However, the embodiments in their broader sense are not as limited, and may, in fact, be used with other types of networks and/or protocols (e.g., wireless). In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   capturing, by a device in a network, a first set of packets based on first packet capture criterion;
   providing the captured first set of packets for deep packet inspection and anomaly detection;
   receiving, at the device, a second packet capture criterion, wherein the second packet capture criterion differs from the first packet capture criterion;
   capturing, by the device, a second set of packets based on the second packet capture criterion;
   providing the captured second set of packets for deep packet inspection and anomaly detection, wherein the anomaly detection of the captured first and second sets of packets is performed by a machine learning-based anomaly detector configured to generate anomaly detection results based in part on one or more traffic metrics gathered from the network and based further in part on deep packet inspection results of packets captured in the network;

generating, by the device, first deep packet inspection results by performing deep packet inspection on the first set of packets;

generating, by the device, a first anomaly detection result by using the first deep packet inspection results as input to the attack detector; and providing, by the device, the first anomaly detection result to a packet capture controller, wherein the second packet capture criteria is received from the packet capture controller and generated by the packet capture controller based on the first anomaly detection result.

2. The method as in claim 1, wherein the first or second packet capture criterion comprises at least one of: one or more network address prefixes, one or more network address ranges, one or more ports, access control list information, one or more interfaces, a time period during which packets are to be captured, or one or more applications associated with traffic in the network.

3. The method as in claim 1, wherein the machine learning-based anomaly detector analyzes deep packet inspection results associated with the first set of captured packets using a first anomaly detection model, and wherein the machine learning-based anomaly detector analyzes deep packet inspection results associated with the second set of captured packets using a second anomaly detection model.

4. The method as in claim 1, further comprising:
providing, by the device, the captured first and second sets of packets to an intrusion protection system (IPS) device, wherein the IPS device is configured to use a signature-based strategy to detect network intrusions.

5. The method as in claim 1, wherein providing the captured first and second sets of packets for deep packet inspection and anomaly detection comprises:
providing, by the device, the captured first and second sets of packets to a second device in the network, wherein the second device in the network executes the machine learning-based anomaly detector.

6. A method, comprising:
receiving, at a device in a network, an anomaly detection result from a machine learning-based anomaly detector, wherein the anomaly detection result is based in part on one or more traffic metrics and based in part on deep packet inspection results for a first set of packets captured based on a first packet capture criterion, wherein the deep packet inspection results are generated by the machine learning based anomaly detector and the device is a packet capture controller;

determining, by the device, a second packet capture criterion, wherein the second packet capture criterion differs from the first packet capture criterion;

sending, by the device, second packet capture criterion to the machine learning based anomaly detector; and causing, by the device and using the second packet capture criterion, a second set of packets to be captured for deep packet inspection and results of the deep packet inspection of the second set of packets to be used as input to the machine learning-based anomaly detector.

7. The method as in claim 6, wherein the second packet capture criterion is determined based in part on the received anomaly detection result or based on input received from a user interface.

8. The method as in claim 7, wherein the second packet capture criterion is determined based further in part on resources available in the network.

9. The method as in claim 6, wherein the machine learning-based anomaly detector is configured to analyze the deep packet inspection results for the first set of packets using a first anomaly detection model, and wherein the machine learning-based anomaly detector is configured to analyze the results of the deep packet inspection of the second set of packets using a second anomaly detection model.

10. The method as in claim 6, wherein the determined second packet capture criterion comprises at least one of: one or more network address prefixes, one or more network address ranges, one or more ports, access control list information, one or more interfaces, or one or more applications associated with traffic in the network.

11. An apparatus, comprising:
one or more network interfaces to communicate with a network;
a processor coupled to the network interfaces and adapted to execute one or more processes; and
a memory configured to store a process executable by the processor, the process when executed configured to:
capture a first set of packets based on first packet capture criterion;
provide the captured first set of packets for deep packet inspection and anomaly detection;
receive a second packet capture criterion, wherein the second packet capture criterion differs from the first packet capture criterion;
capture a second set of packets based on the second packet capture criterion;
provide the captured second set of packets for deep packet inspection and anomaly detection, wherein the anomaly detection of the captured first and second sets of packets is performed by a machine learning-based anomaly detector configured to generate anomaly detection results based in part on one or more traffic metrics gathered from the network and based further in part on deep packet inspection results of packets captured in the network;
generate first deep packet inspection results by performing deep packet inspection on the first set of packets;
generate a first anomaly detection result by using the first deep packet inspection results as input to the attack detector; and
provide the first anomaly detection result to a packet capture controller, wherein the second packet capture criteria is received from the packet capture controller and generated by the packet capture controller based on the first anomaly detection result.

12. The apparatus as in claim 11, wherein the first or second packet capture criterion comprises at least one of: one or more network address prefixes, one or more network address ranges, one or more ports, access control list information, one or more interfaces, one or more applications associated with traffic in the network, or data indicative of when packets matching the packet capture criterion are to be captured.

13. The apparatus as in claim 11, wherein the process when executed is further configured to:
provide the captured first and second sets of packets to an intrusion protection system (IPS) device, wherein the IPS device is configured to use a signature-based strategy to detect network intrusions; or
provide the captured first and second sets of packets to a second device in the network, wherein the second device in the network executes the machine learning-based anomaly detector.

14. An apparatus, comprising:
one or more network interfaces to communicate with a network;
a processor coupled to the network interfaces and adapted to execute one or more processes; and
a memory configured to store a process executable by the processor, the process when executed configured to:
receive an anomaly detection result from a machine learning-based anomaly detector, wherein the anomaly detection result is based in part on one or more traffic metrics and based in part on deep packet inspection results for a first set of packets captured based on a first packet capture criterion, wherein the deep packet inspection results are generated by the machine learning based anomaly detector and the device is a packet capture controller;
determine a second packet capture criterion, wherein the second packet capture criterion differs from the first packet capture criterion;
send second packet capture criterion to the machine learning based anomaly detector; and
cause, using the second packet capture criterion, a second set of packets to be captured for deep packet inspection and results of the deep packet inspection of the second set of packets to be used as input to the machine learning-based anomaly detector.

15. The apparatus as in claim 14, wherein the second packet capture criterion is determined based in part on the received anomaly detection result or based in part on resources available in the network.

16. The apparatus as in claim 14, wherein the second packet capture criterion is determined based on input received from a user interface.

17. The apparatus as in claim 14, wherein the determined second packet capture criterion comprises at least one of: one or more network address prefixes, one or more network address ranges, one or more ports, access control list information, one or more interfaces, or one or more applications associated with traffic in the network.

* * * * *

UNITED STATES PATENT AND TRADEMARK OFFICE
CERTIFICATE OF CORRECTION

PATENT NO. : 9,930,057 B2
APPLICATION NO. : 14/874594
DATED : March 27, 2018
INVENTOR(S) : Andrea Di Pietro et al.

Page 1 of 1

It is certified that error appears in the above-identified patent and that said Letters Patent is hereby corrected as shown below:

In the Specification

In Column 12, Line 38, please amend as shown:
puted based on Netflow or similar traffic reports) and models Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*